United States Patent
Lee et al.

(10) Patent No.: US 9,887,712 B2
(45) Date of Patent: Feb. 6, 2018

(54) WIDEBAND FRONT-END DEVICE AND RF SIGNAL FILTERING METHOD THEREOF

(71) Applicant: AIROHA TECHNOLOGY CORP., Hsinchu (TW)

(72) Inventors: Chien-Kuang Lee, Hsinchu (TW); Heng-Chih Lin, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 0 days.

(21) Appl. No.: 15/073,883

(22) Filed: Mar. 18, 2016

(65) Prior Publication Data
US 2016/0352366 A1    Dec. 1, 2016

(30) Foreign Application Priority Data
May 28, 2015    (TW) .............................. 104117177 A

(51) Int. Cl.
*H04B 1/04*    (2006.01)
*H04B 1/00*    (2006.01)

(52) U.S. Cl.
CPC ......... *H04B 1/0475* (2013.01); *H04B 1/0064* (2013.01); *H04B 1/0483* (2013.01)

(58) Field of Classification Search
CPC .......... H04B 17/12; H04B 17/21; H04B 1/71; H04B 1/71637; H04B 7/0613; H04B 7/0837; H04B 7/12; H04B 1/0475; H04B 1/38; H04B 1/707; H04B 2001/0425; H04B 1/1036; H04B 1/525; H04B 1/7101; H04B 1/7107; H04B 1/71635; H04B 1/719

USPC ....................................................... 455/114.2
See application file for complete search history.

(56) References Cited

U.S. PATENT DOCUMENTS

| | | | | |
|---|---|---|---|---|
| 2002/0008575 A1* | 1/2002 | Oskowsky | ............ | H03F 1/0277 330/51 |
| 2010/0029227 A1* | 2/2010 | Narathong | ............ | H03F 1/0277 455/127.1 |
| 2013/0109433 A1* | 5/2013 | Wang | ..................... | H04B 1/525 455/552.1 |

FOREIGN PATENT DOCUMENTS

| | | |
|---|---|---|
| CN | 1917685 A | 2/2007 |
| CN | 103227657 A | 7/2013 |
| CN | 104320154 A | 1/2015 |
| TW | 201434279 A | 9/2014 |

* cited by examiner

*Primary Examiner* — Ajibola Akinyemi
(74) *Attorney, Agent, or Firm* — Rosenberg, Klein & Lee

(57) ABSTRACT

A wideband front-end device comprises a wideband amplifying module and a plurality of narrow band filters. The wideband amplifying module comprises an input end, a plurality connecting ends and at least one receiving end. A wideband transmitting RF signal can be transmitted to one of the connecting ends from the input end according to the frequency band thereof. Thus, the wideband transmitting RF signal can be divided into several narrow band signals with different frequency bands. Each narrow band signal with different frequency bands is transmitted to different connecting ends and narrow band filters respectively. Therefore, each narrow band filter can be used to filter wideband transmitting RF signal or narrow band signals with different frequency bands respectively to reduce production costs of the wideband front-end device.

12 Claims, 10 Drawing Sheets

US 9,887,712 B2

WIDEBAND FRONT-END DEVICE AND RF SIGNAL FILTERING METHOD THEREOF

REFERENCE TO RELATED APPLICATIONS

This non-provisional application claims priority claim under 35 U.S.C. § 119(a) on Taiwan Patent Application No. 104117177 filed May 28, 2015, the entire contents of which are incorporated herein by reference.

FIELD OF THE INVENTION

The present invention relates to a wideband front-end device and an RF signal filtering method thereof. A wideband transmitting RF signal is divided into a plurality of frequency bands, and the narrow band filters can filter the wideband transmitting RF signal with different frequency bands to reduce the production costs of the wideband front-end device.

BACKGROUND

Wireless communications specifications change rapidly, such as 2G, 3G and 4G, and data speeds is also improved. However, the frequency and mode of each wireless communication are different, and the latest mobile communication device must provide downward compatible.

FIG. 1 is a circuit diagram of a common wideband front-end device. The wideband front-end device 10 comprises an amplifying unit 11, a switch device 13, a wideband filter 15 and an antenna unit 17, and the amplifying unit 11 is connected to the antenna unit 17 via the switch device 13 and wideband filter 15. For instance, the wideband filter 15 is a FBAR filter (Film Bulk Acoustic Resonator Filter) or a Bulk Acoustic Wave Filter (BAW Filter).

When the wideband front-end device 10 transmits a wideband transmitting RF signal RFwt, the amplifying unit 11 is connected to the wideband filter 15 via the switch device 13. Thus, the wideband transmitting RF signal RFwt inputted from the input end 111 of the wideband front-end device 10 is transmitted to the wideband filter 15 via the amplifying unit 11 and the switch device 13 in turn. The wideband transmitting RF signal RFwt filtered by the wideband filter 15 is transmitted to the antenna unit 17 to emit the wideband transmitting RF signal RFwt.

When the wideband front-end device 10 receives a wideband receiving RF signal RFwr, the receiving end 131 is connected to the wideband filter 15 via the switch device 13. Thus, the wideband receiving RF signal RFwr received by the antenna unit 17 is filtered by the wideband filter 15, and then transmitted to the receiving end 131 via the switch device 13.

Above wideband front-end device 10 uses expensive wideband filter 15 to filter the wideband transmitting RF signal RFwt with wider bandwidth and the wideband receiving RF signal RFwr with wider bandwidth, causing cost increment of the wideband front-end device 10.

SUMMARY

It is one object of the present invention to provide a wideband front-end device. The wideband front-end device is able to divide the wideband transmitting RF signal into a plurality of frequency bands or narrow band signals base on the frequency band plan of the baseband or the transceiver connecting to the present invention, and the wideband transmitting RF signal with different frequency bands or narrow band signals are transmitted to different paths respectively. Thus, each narrow band filter is able to filter the wideband transmitting RF signal with different frequency bands or narrow band signals respectively to reduce production costs of the wideband front-end device.

It is one object of the present invention to provide a wideband front-end device. The wideband front-end device is able to divide the wideband transmitting RF signal into a plurality of frequency bands or narrow band signals base on the frequency band plan of the baseband or the transceiver connecting to the present invention. A control unit turns on or turns off amplifying units according to frequency band of the wideband transmitting RF signal or narrow band signals, and the wideband transmitting RF signal or narrow band signals with different frequency bands can be transmitted to different narrow band filters to reduce the production costs and maintain the performance of the wideband front-end device.

It is one object of the present invention to provide a wideband front-end device to reduce number of switch units and power loss of the wideband transmitting or receiving RF signals.

It is one object of the present invention to provide a wideband front-end device. The wideband front-end device is able to divide an RF signal into a transmitting RF signal and a wideband transmitting RF signal, and divide the wideband transmitting RF signal into a plurality of frequency bands or narrow band signals base on the frequency band plan of the baseband or the transceiver connecting to the present invention. Thus, the narrow band filters are able to filter the transmitting RF signal and wideband transmitting RF signal to reduce production costs of the wideband front-end device.

For achieving above objects, the present invention provides a wideband front-end device, comprising: a wideband amplifying module for receiving a wideband transmitting RF signal and outputting a plurality of narrow band signals with different frequency bands, and comprising; a first switch device comprising at least one first input end and a plurality of first connecting ends, wherein the first input end is electrically connected to one of the first connecting ends via the first switch device according to the frequency band of the wideband transmitting RF signal inputted into the first input end to transmit the wideband transmitting RF signal from the first input end to one of the connecting ends, and thus each the first connecting end outputs the narrow band signal with different frequency bands respectively; and at least one amplifying unit electrically connected to the first switch device to amplify the wideband transmitting RF signal.

The present invention provides another wideband front-end device comprising: a wideband amplifying module for receiving a wideband transmitting RF signal and outputting a plurality of narrow band signals with different frequency bands, and comprising; at least one first input end receiving the wideband transmitting RF signal; a plurality of first connecting ends electrically connected to the first input end; a plurality of first amplifying units connected to each the first connecting end respectively; and a control unit electrically connected to each first amplifying unit to turn on or turn off each first amplifying unit, wherein the control unit turns on one of the first amplifying units according to frequency band of the wideband transmitting RF signal, and each first amplifying unit is able to amplify the narrow band signals with different frequency bands respectively.

The present invention provides an RF signal filtering method of a wideband front-end device, comprising the steps of: transmitting an RF signal; distinguish the RF signal being a transmitting RF signal or a wideband transmitting RF signal, wherein bandwidth of the wideband transmitting RF signal is larger than the transmitting RF signal; dividing the wideband transmitting RF signal into a plurality of narrow band signals with different frequency bands; and filtering the narrow band signals with different frequency bands by different narrow band filters respectively.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

Figure 1:
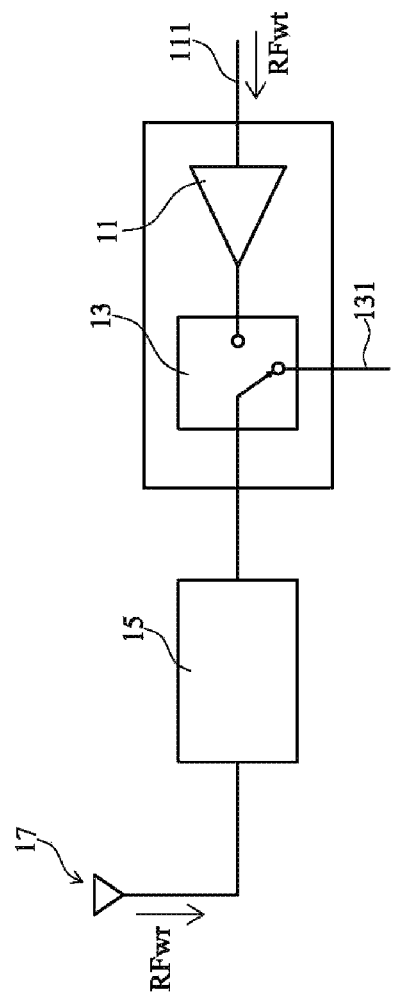
FIG. 1 is a circuit diagram of a common wideband front-end device.
Figure 2:
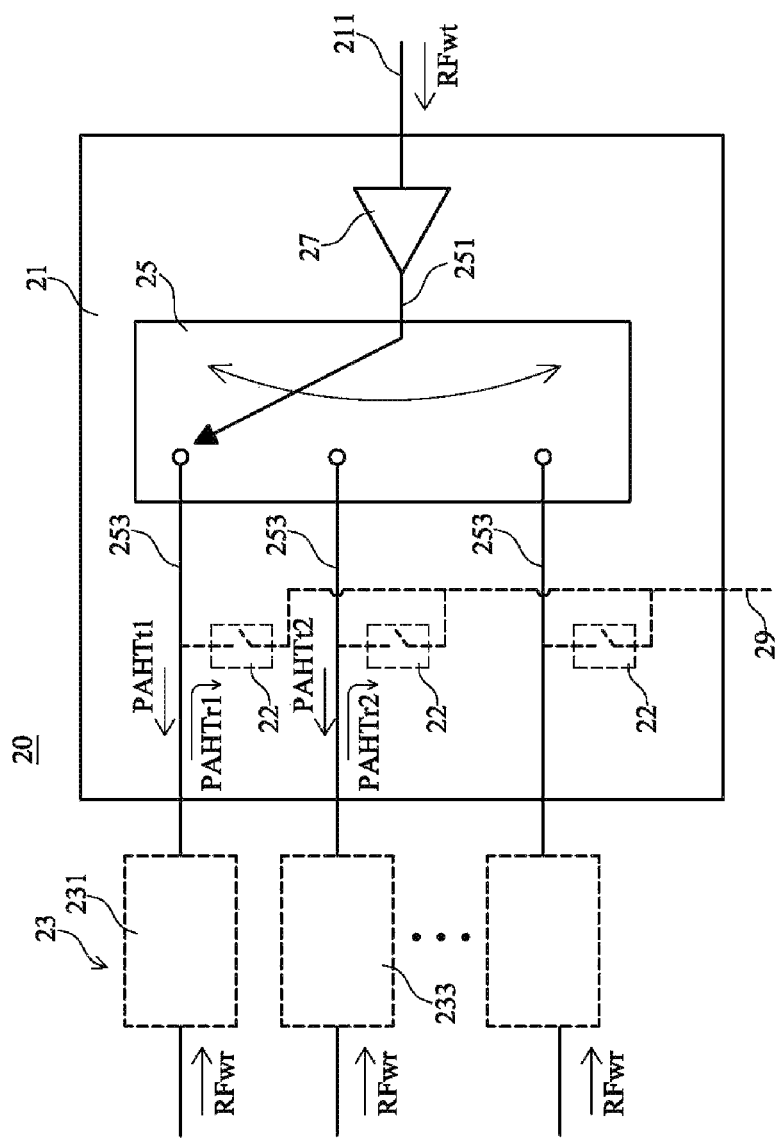
FIG. 2 is a circuit diagram of a wideband front-end device according to an embodiment of the invention.

FIG. 2 is a circuit diagram of a wideband front-end device according to an embodiment of the invention. The wideband front-end device 20 comprises a wideband amplifying module 21 for receiving a wideband transmitting RF signal RFwt, and outputting a plurality of narrow band signals with different bands.

In one embodiment of the invention, the wideband front-end device 20 may comprise at least one receiving end 29 and/or a plurality of narrow band filters 23, such as SAW filter (Surface Acoustic Wave Filter). The wideband amplifying module 21 is electrically connected to each narrow band filter 23, and the receiving end 29 is electrically connected to each first connecting end 253 via a first switch unit 22 respectively for receiving a wideband receiving RF signal RFwr via the first connecting end 253. In other embodiment of the invention, the wideband front-end device 20 may not comprise the receiving end 29, the first switch unit 22 and the narrow band filter 23, and the receiving end 29, the first switch unit 22 and the narrow band filter 23 are not limitation of the invention. Thus, the receiving end 29, the first switch unit 22 and the narrow band filter 23 are indicated by dotted line in FIG. 2.

The wideband amplifying module 21 comprises a first switch device 25, at least one amplifying unit 27 and at least one receiving end 29, and the first switch device 25 is electronically connected to the amplifying unit 27 and the receiving end 29. In one embodiment of the invention, the first switch device 25 comprises a first input end 251 and a plurality of first connecting ends 253, and each narrow band filter 23 is electrically connected to each first connecting end 253 respectively and/or the receiving end 29.

The wideband transmitting RF signal RFwt is inputted into the first input end 211, and transmitted to the wideband amplifying module 21 and the first switch device 25. The first switch device 25 is able to connect the first input end 251 to one of first connecting ends 253 according to frequency band of the wideband transmitting RF signal RFwt received by the first input end 211. In particular embodiment of the invention, the first switch device 25 is able to transmit the wideband transmitting RF signal RFwt inputted from the first input end 211 to one of first connecting ends 253 according to the frequency band of the wideband transmitting RF signal RFwt.

The wideband transmitting RF signal RFwt is an RF signal with wider bandwidth. For instance, the wideband transmitting RF signal RFwt may be band 41 (B41) (2496 MHz to 2690 MHz) of LTE (Long Term Evolution). In generally, the wideband filter 15 is used to filter the wideband transmitting RF signal RFwt, and the narrow band filter 23 is unable to filter the wideband transmitting RF signal RFwt directly.

In this embediment of the invention, the wideband transmitting RF signal RFwt is divided into a plurality of frequency bands or a plurality of narrow band signals in advance by the baseband or the transceiver connecting to the first input end 211, and the wideband transmitting RF signals RFwt or the narrow band signals with different frequency bands are transmitted to different first connecting ends 253 respectively. Thus, each of narrow band filters 23 connected to first connecting ends 253 respectively is able to receive and filter the wideband transmitting RF signals RFwt or the narrow band signals with different frequency bands respectively to reduce production costs of the wideband front-end device 20. For instance, if the wideband transmitting RF signal RFwt, transmitted from the transceiver connecting to the first input end 211, is B41 of LTE, 2496 MHz to 2590 MHz of the B41 may be defined as a first frequency band or a first narrow band signal, and 2591 MHz to 2690 MHz of the B41 may be defined as a second frequency band or a second narrow band signal. The wideband transmitting RF signal RFwt in the first frequency band or the first narrow band signal may be transmitted to a first transmitting path PATHt1, and a first narrow band filter 231 is able to filter the wideband transmitting RF signal RFwt in the first frequency band or the first narrow band signal. Further, the wideband transmitting RF signal RFwt in the second frequency band or the second narrow band signal may be transmitted to a second transmitting path PATHt2, and a second narrow band filter 233 is able to filter the wideband transmitting RF signal RFwt in the second frequency band or the second narrow band signal. Thus, it is unnecessary to install a wideband filter 15 in the wideband front-end device 20 to reduce the production costs and maintain the performance of the wideband front-end device 20.

The band B41 of LTE is one embodiment of the invention, and is not limitation of the invention. In actual application, the wideband front-end device 20 can be used to filter the wideband transmitting RF signal RFwt with different frequency band to reduce production costs thereof. Further, it is one embodiment to divide the wideband transmitting RF signal RFwt into the first frequency band and the second frequency band. In other embodiment of the invention, the wideband transmitting RF signal RFwt may be divided into more than two frequency bands or narrow band signals base on the frequency band plan of the baseband or the transceiver connecting to the embodiment of the invention. Moreover, the range of the first frequency band and the second frequency is one embodiment of the invention. In actual application, the range of the first and the second frequency band are able to be adjusted.

In actual application, a wideband receiving RF signal RFwr can also be divided into a plurality of frequency bands or narrow band signals based on the frequency band plan of the baseband or the transceiver connecting to the embodiment of the invention. Each receiving path is used to receive the wideband receiving RF signal RFwr or narrow band signals with different frequency bands respectively, and each narrow band filter 23 is able to filter the wideband receiving RF signal RFwr or the narrow band signals with different frequency bands respectively. For instance, the wideband receiving RF signal RFwr can be divided into a first frequency band and a second frequency band. The wideband receiving RF signal RFwr in the first frequency band, such as the first narrow band signal, is transmitted to a first receiving path PATHr1, and the first narrow band filter 231 is able to filter the wideband receiving RF signal RFwr in the first frequency band or the first narrow band signal. Further, the wideband receiving RF signal RFwr in the second frequency band may be transmitted to a second receiving path PATHr2, and the second narrow band filter 233 is able to filter the wideband receiving RF signal RFwr in the second frequency band or the second narrow band signal.

In one embodiment of the invention, the receiving end 29 is connected to each first connecting end 253 via a first switch unit 22 respectively. Each first switch unit 22 is used to switch the connection between the receiving end 29 and each first connecting end 253 respectively, and the receiving end 29 is able to receive the wideband receiving RF signal RFwr from the first connecting end 253 via the first switch unit 22. Further, when the wideband front-end device 20 is transmitting the wideband transmitting RF signal RFwt, each first switch unit 22 will be turned off to isolate the receiving end 29 and each first connecting end 253, and the wideband transmitting RF signal RFwt in different frequency bands can be transmitted to an antenna via each transmitting path respectively. When the wideband front-end device 20 is used to receive the wideband receiving RF signal RFwr, the first switch device 25 may be turned off, and part of or all first switch unit(s) 22 may be turned on. For instance, part of first switch unit(s) 22 is turned on according to the frequency band of the wideband receiving RF signal RFwr. The receiving end 29 is able to be electrically connected to one or more than one first connecting end 253 via the first switch unit 22 to receive the wideband receiving RF signal RFwr from the first connecting end 253 via the receiving path.

Figure 3:
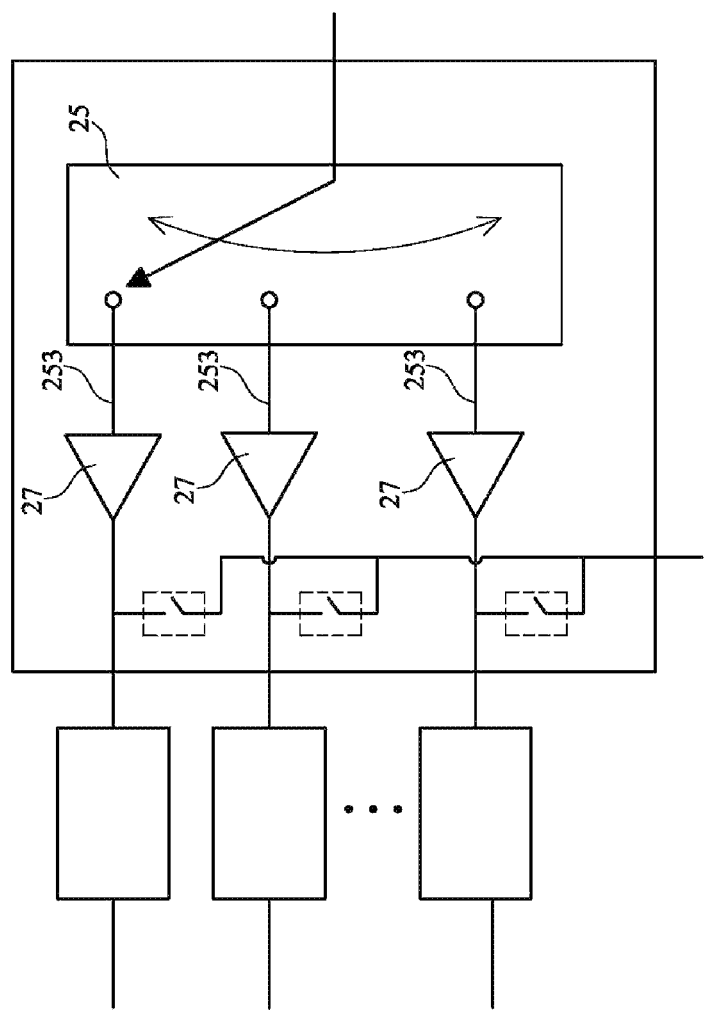
FIG. 3 is a circuit diagram of a wideband front-end device according to another embodiment of the invention.
Figure 4:
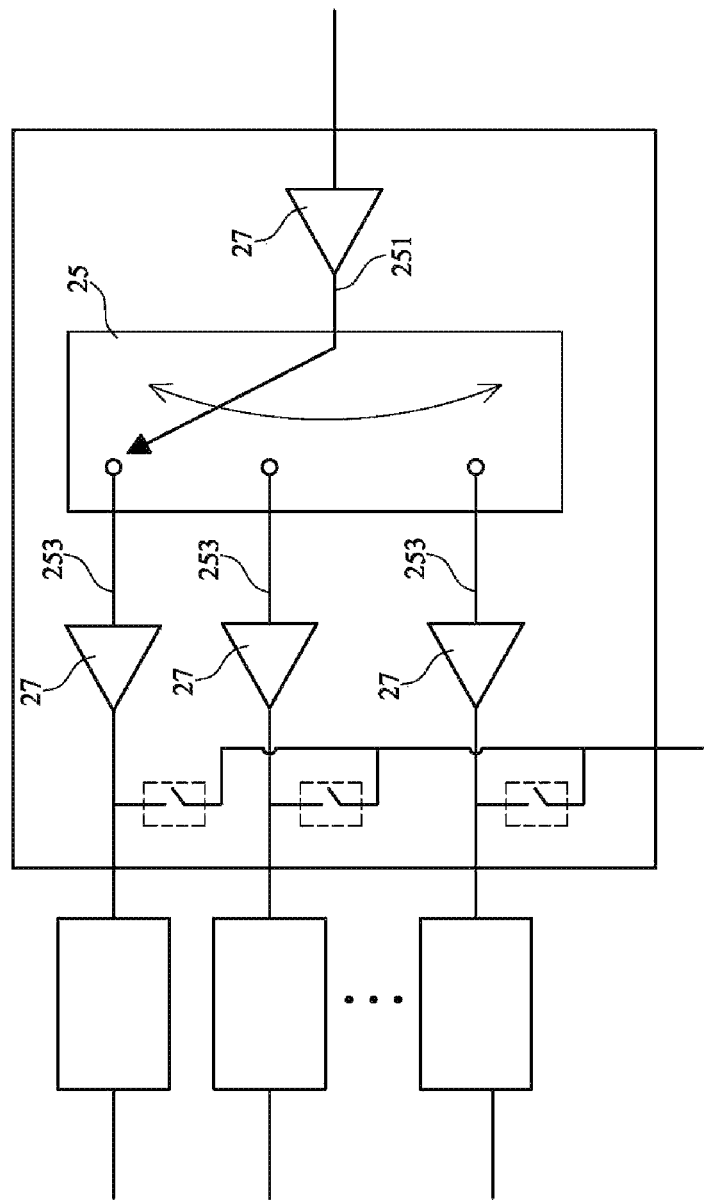
FIG. 4 is a circuit diagram of a wideband front-end device according to another embodiment of the invention.

The amplifying unit 27 of the invention is installed on the transmitting path of the wideband transmitting RF signal RFwt to amplify the wideband transmitting RF signal RFwt. For instance, the amplifying unit(s) 27 may be connected to the first input end 251 and/or the first connecting ends 253 of the first switch device 25. In one embodiment of the invention, the amplifying unit 27 is connected to the first input end 251 of the first switch device 25, and the wideband transmitting RF signal RFwt is amplified by the amplifying unit 27 firstly, and then transmitted to the first switch device 25, as shown in FIG. 2. In other embodiment of the invention, there is a plurality of amplifying units 27 to be connected to each first connecting end 253 respectively, and the wideband transmitting RF signal RFwt passes through the first switch device 25 firstly, and then is amplified by the amplifying unit 27, as shown in FIG. 3. In other embodiment of the invention, the first input end 251 and each first connecting end 253 are all connected to the amplifying unit 27 respectively. The amplifying unit 27 connected to the first input end 251 of the first switch device 25 may be similar to a driver stage amplifier, and the amplifying unit 27 connected to the first connecting end may be similar to an output stage amplifier, as shown in FIG. 4.

The switch device 13 of the common wideband front-end device 10 is used to select the receiving path or the transmitting path, and the wideband receiving RF signal RFwr and the wideband transmitting RF signal RFwt must pass through the switch device 13, causing power loss of the wideband receiving RF signal RFwr and the wideband transmitting RF signal RFwt. In the embodiment of FIGS. 3 and 4, the wideband front-end device 20 does not request to install the switch device 13 behind the amplifying units 27 connected to the first connecting end 253, such as between the amplifying units 27 connected to the first connecting end 253 and the narrow band filter 23 or the antenna, to reduce power loss of the wideband transmitting RF signal RFwt.

The amplifying unit 27 connected to the first input end 251 and the amplifying units 27 connected to the first connecting ends 253 may be the same or different amplifier. Further, each narrow band filter 23 of the invention may be the same or different filter. For instance, each narrow band filter 23 is appropriate to filter RF signal with different frequency bands respectively.

Figure 5:
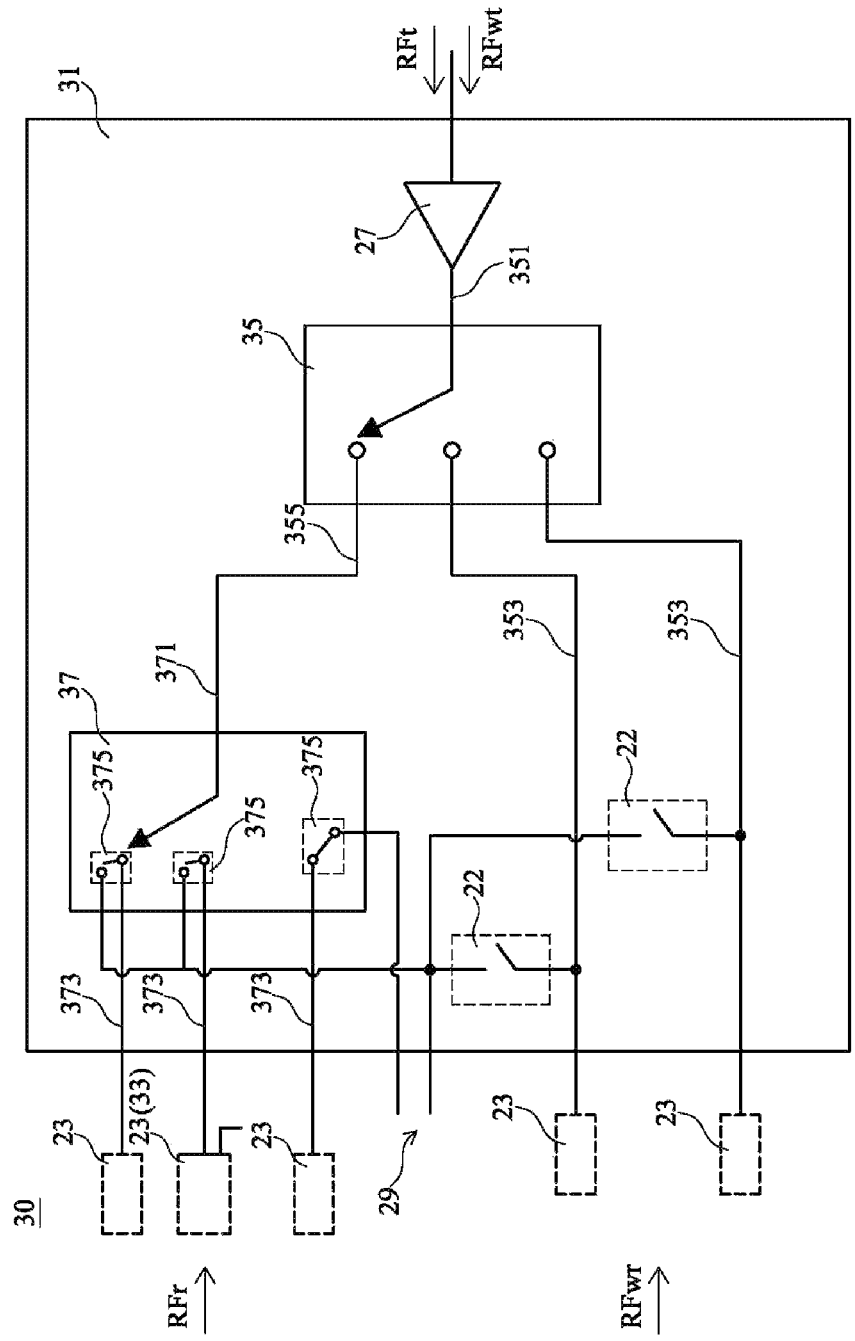
FIG. 5 is a circuit diagram of a wideband front-end device according to another embodiment of the invention.

FIG. 5 is a circuit diagram of a wideband front-end device according to another embodiment of the invention. The wideband front-end device 30 comprises a wideband amplifying module 31 and a plurality of narrow band filters 23, and the wideband amplifying module 31 is electrically connected to each narrow band filter 23.

The wideband amplifying module 31 comprises a first switch device 35, at least one amplifying unit 27, a second switch device 37 and at least one receiving end 29, and the first switch device 35 is electrically connected to the amplifying unit 27, the second switch device 37 and the receiving end 29. In one embodiment of the invention, the first switch device 35 comprises a first input end 351, a plurality of first connecting ends 353 and at least one first transmitting end 355, and the first switch device 35 is able to connect the first input end 351 to the first transmitting end 355 or at least one first connecting end 353. The second switch device 37 comprises a second input end 371 and a plurality of second connecting ends 373, and the first transmitting end 355 of the first switch device 35 is connected to the second input end 371 of the second switch device 35. Each first connecting end 353 of the first switch device 35 is connected to the narrow band filter 23 respectively and further connected to the receiving end 29 through a first switch unit 22, and each second connecting end 373 of the second switch device 37 is connected to the narrow band filter 23 or a DUP (Duplexer) filter 33.

In one embodiment of the invention, the RF signal inputted from the first input end 351 may be classified into a transmitting RF signal RFt or a wideband transmitting RF signal RFwt. The frequency band of the transmitting RF signal RFt and the wideband transmitting RF signal RFwt may be the same or different, and the bandwidth of the transmitting RF signal RFt is different from the wideband transmitting RF signal RFwt. For instance, the bandwidth of the wideband transmitting RF signal RFwt is larger than the transmitting RF signal RFt. When the transmitting RF signal RFt is inputted from the first input end 351 of the wideband amplifying module 31, the first input end 351 is connected to the first transmitting end 355 by the first switch device 35, and the transmitting RF signal RFt is able to be transmitted to the second switch device 37 via the first switch device 35, the first transmitting end 335 and the second input end 371. Then, the transmitting RF signal RFt is transmitted to one of second connecting ends 373 via the second switch device 37, and the narrow band filter 23 connected to the second connecting end 373 is able to filter the transmitting RF signal RFt. When the wideband transmitting RF signal RFwt is inputted from the first input end 351 of the wideband amplifying module 31, the first input end 351 is connected to one of first connecting ends 353 by the first switch device 35. The wideband transmitting RF signal RFwt is divided in advance by the baseband or the transceiver connecting to the first input end 351 into a plurality of frequency bands and connecting to the first switch device 35, and the wideband transmitting RF signal RFwt with different frequency bands is transmitted to different first connecting ends 353 respectively. Thus, each narrow band filter 23 is able to filter the wideband transmitting RF signal RFwt with different frequency band respectively. The detail method or structure has been described in FIG. 2 to FIG. 4, and the repetitious details need not be given here.

The narrow band filter 23 is able to filter the transmitting RF signal RFt directly, and it does not request to divide the transmitting RF signal RFt into several frequency bands or narrow band signals. For instance, the wideband transmitting RF signal RFwt may be band 41 (B41) of LTE, and the transmitting RF signal RFt may be bands 7 (B7), 38 (B38), 40 (B40) of LTE. Bands B7, B38, B40 and B41 are embodiments of the invention, and are not limitation of the invention.

In one embodiment of the invention, the second switch device 37 further comprises a plurality of second switch units 375. Each second switch unit 375 is electrically connected to the second connecting end 373 and the receiving end 29, and is able to switch the connection of each second connecting end 373 and the receiving end 29 respectively. For instance, when the second switch device 37 of the wideband front-end device 30 is transmitting the transmitting RF signal RFt, each second switch unit 375 will be turned off to isolate the receiving end 29 and each second connecting end 373, and the transmitting RF signal RFt is able to be transmitted to the narrow band filter 23 and/or the DUP filter 33 from the second switch device 37. When the second switch device 37 of the wideband front-end device 30 is used to receive the receiving RF signal RFr, part of or all second switch unit(s) 375 may be turned on. The receiving end 29 is able to be electrically connected to one or more than one second connecting end 373 via the second switch unit 375 to receive the receiving RF signal RFr from the second connecting end 373 and the second switch unit 375. In this embodiment of the invention, the second switch units 375 are located within the second switch device 37. In other embodiment of the invention, the second switch units 375 may be located outside of the second switch device 37.

The RF signal received by the wideband front-end device 30 can also be classified into the receiving RF signal RFr and the wideband receiving RF signal RFwr based on the frequency band plan of the baseband or the transceiver connecting to the embodiment of the invention. The frequency band between the receiving RF signal RFr and the wideband receiving RF signal RFwr may be the same or different, the distinction between the receiving RF signal RFr and the wideband receiving RF signal RFwr is the bandwidth of the wideband receiving RF signal RFwr larger than the receiving RF signal RFr. When the wideband front-end device 30 is used to receive the receiving RF signal RFr, part of or all switch units 375 may be turned on, and the receiving RF signal RFr is transmitted to the receiving end 29 via the second connecting end 373 and the second switch unit 375. When the wideband front-end device 30 is used to receive the wideband receiving RF signal RFwr, the first switch device 35 may be turned off, and part of or all first switch units 22 may be turned on. For instance, part of or all first switch units 22 may be turned on according the frequency band of the wideband receiving RF signal RFwr. Thus, the receiving end 29 is able to be electrically connected to one or more than one first connecting end 353 via the first switch unit 22 to receive the wideband receiving RF signal RFwr from the first connecting end 353.

Figure 6:
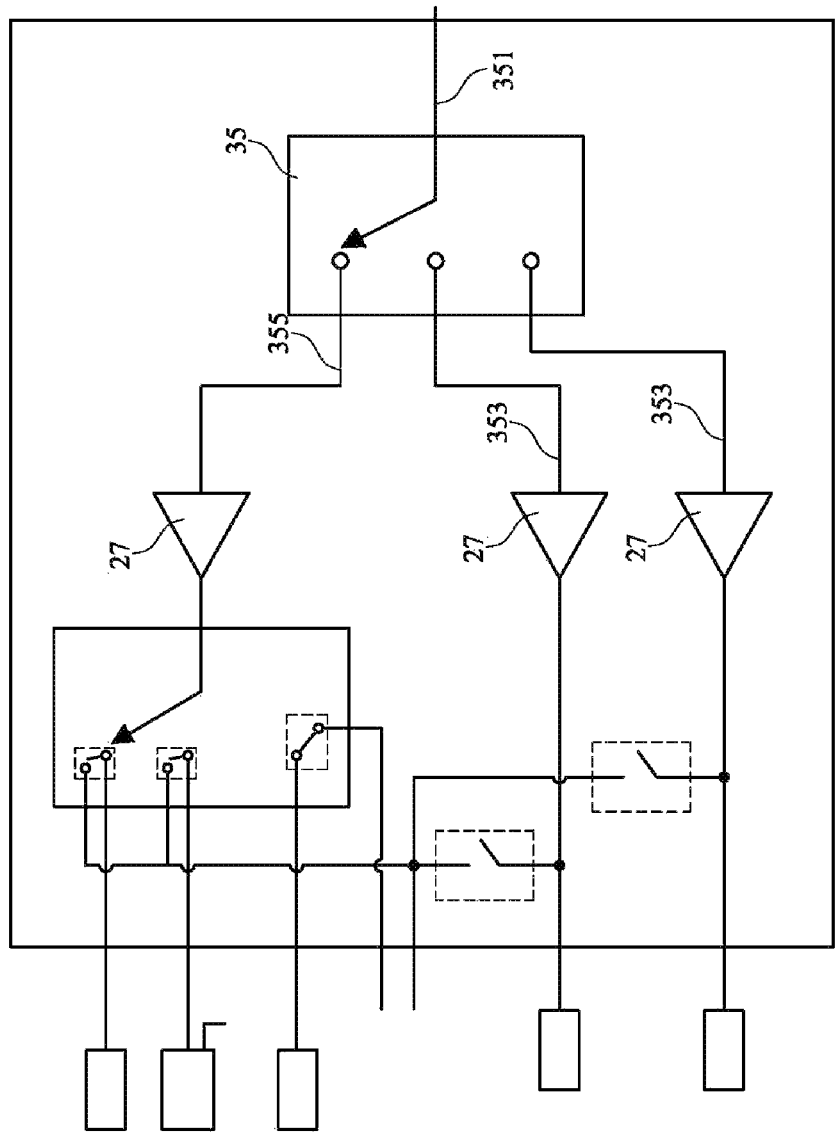
FIG. 6 is a circuit diagram of a wideband front-end device according to another embodiment of the invention.
Figure 7:
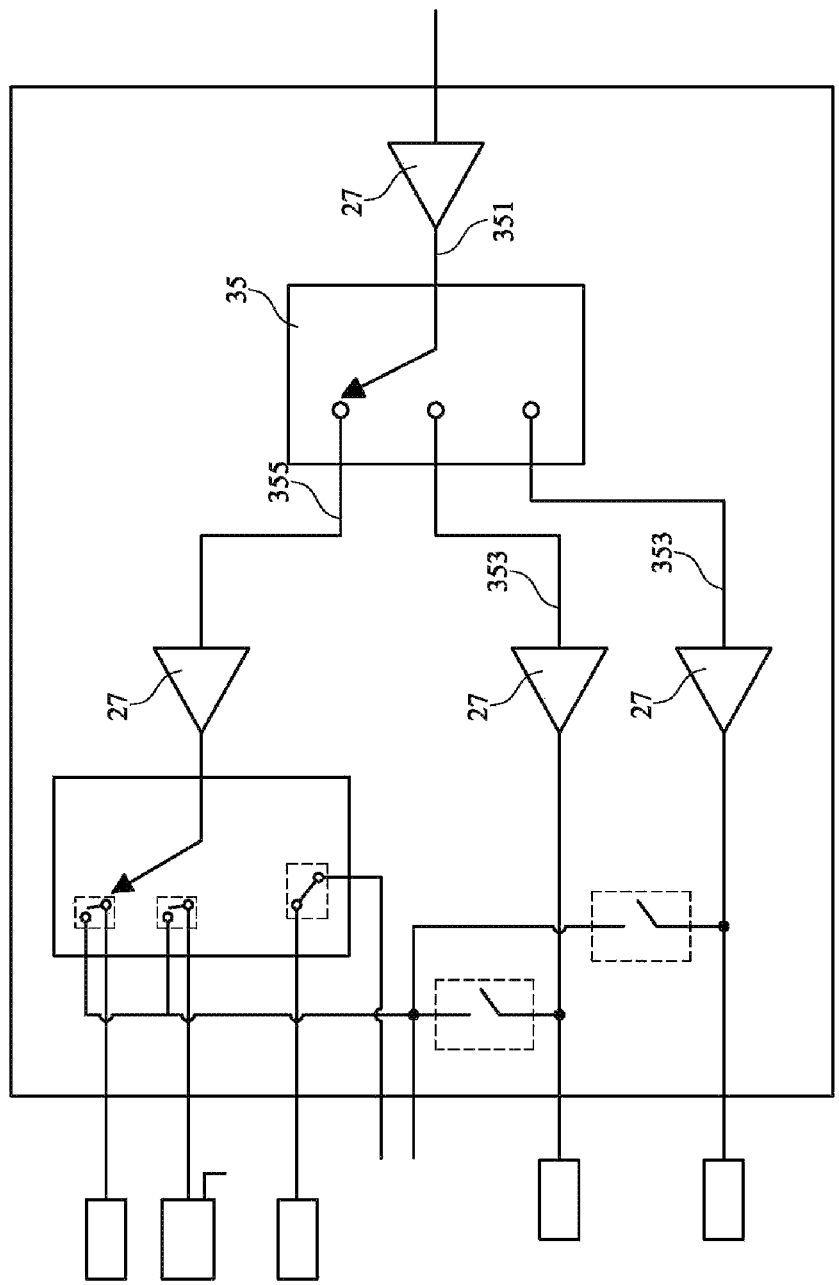
FIG. 7 is a circuit diagram of a wideband front-end device according to another embodiment of the invention.

The amplifying unit 27 of the invention is installed on the transmitting path to amplify the wideband transmitting RF signal RFwt or the transmitting RF signal RFt. For instance, the amplifying unit 27 is connected to the first input end 351 and/or the first connecting ends 353 and/or first transmitting end 355 of the first switch device 35. In one embodiment of the invention, the amplifying unit 27 is connected to the first input end 351 of the first switch device 35, and the wideband transmitting RF signal RFwt or the transmitting RF signal RFt is amplified by the amplifying unit 27 firstly, and then transmitted to the first switch device 35, as shown in FIG. 5. In other embodiment of the invention, there is a plurality of amplifying units 27 to be connected to each first connecting end 353 and first transmitting end 355 of the first switch device 35 respectively, and the wideband transmitting RF signal RFwt or the transmitting RF signal RFt is passing through the first switch device 35 firstly, and then amplified by the amplifying unit 27, as shown in FIG. 6. In other embodiment of the invention, the first input end 351, the first transmitting end 355 and each first connecting end 353 are all connected to the amplifying unit 27 respectively. The amplifying unit 27 connected to the first input end 351 of the first switch device 35 may be similar to a driver stage amplifier, and the amplifying unit 27 connected to the first connecting end 353 and the first transmitting end 355 of the first switch device 35 may be similar to an output stage amplifier, as shown in FIG. 7.

The switch device 13 of the common wideband front-end device 10 is used to select the receiving path or the transmitting path, and the wideband receiving RF signal RFwr and the wideband transmitting RF signal RFwt must pass through the switch device 13, causing power loss of the wideband receiving RF signal RFwr and the wideband transmitting RF signal RFwt. In this embodiment of FIGS. 6 and 7, the wideband front-end device 30 does not request to install the switch device 13 behind the amplifying units 27 connected to the first connecting end 353 and the first transmitting end 355, such as between the amplifying units 27 connected to the first connecting end 353 and the first transmitting end 355 and the narrow band filter 23 or the antenna, to reduce the power loss of the wideband transmitting RF signal RFwt.

Figure 8:
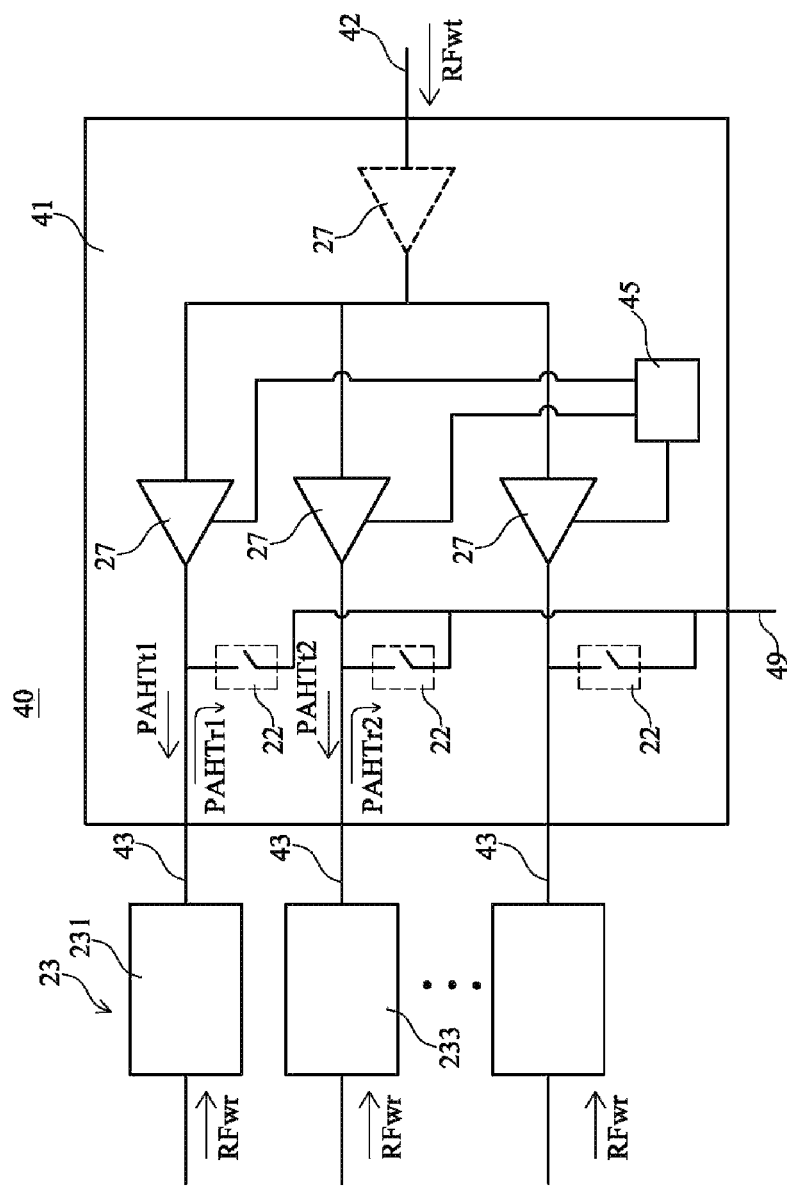
FIG. 8 is a circuit diagram of a wideband front-end device according to another embodiment of the invention.

FIG. 8 is a circuit diagram of a wideband front-end device according to another embodiment of the invention. The wideband front-end device 40 comprises a wideband amplifying module 41 for receiving a wideband transmitting RF signal RFwt and outputting a plurality of narrow band signals with different frequency band.

The wideband amplifying module 41 is similar to the wideband amplifying module 21 of FIG. 2 to FIG. 4, and the difference there between is that the wideband amplifying module 41 does not request to install the first switch device 25 to reduce power loss of the wideband transmitting RF signal RFwt. Further, wideband front-end device 40 may not comprise the receiving end 49, the first switch unit 22 and the narrow band filter 23, and the receiving end 49, the first switch unit 22 and the narrow band filter 23 are not limitation of the invention.

The wideband amplifying module 41 comprises a plurality of amplifying units 27, at least one control unit 45, a first input end 42, a plurality of first connecting ends 43 and at least one receiving end 49, and each amplifying unit 27 is located between each first connecting end 43 and the first input end 42 respectively. The control unit 45 is connected each amplifying unit 27 to turn on or turn off each amplifying unit 27 respectively. For instance, the control unit 45 may turn on one of amplifying units 27 to amplify the narrow band signal according to the frequency band of the wideband transmitting RF signal RFwt, and thus each amplifying unit 27 is able to amplify narrow band signals with different frequency bands respectively. Each first connecting end 43 is connected to each narrow band filter 23, and each narrow band filter 23 is used to filter the wideband transmitting RF signal RFwt and the wideband receiving RF signal RFwr with different frequency bands respectively. Further, each first switch unit 22 is located between each first connecting end 43 and the receiving end 49 to switch the connection between each first connecting end 43 and the receiving end 49.

The wideband amplifying module 41 receives the wideband transmitting RF signal RFwt from the first input end 42 thereof, and the control unit 45 is able to turn on one of amplifying units 27 to amplify the wideband transmitting RF signal RFwt according to the frequency band of the wideband transmitting RF signal RFwt. Thus, the wideband transmitting RF signal RFwt with distinct frequency bands will be transmitted to distinguishable amplifying units 27, first connecting ends 43 and narrow band filters 23.

In particular embedment of the invention, the wideband transmitting RF signal RFwt is divided in advance by the baseband or the transceiver connecting to the first input end 42 into a plurality of frequency bands or narrow band signals, and the wideband transmitting RF signals RFwt or narrow band signals with different frequency bands are transmitted to different amplifying units 27, first connecting ends 43 and narrow band filters 23 respectively. Thus, each of narrow band filters 23 is able to receive and filter the wideband transmitting RF signal RFwt with different frequency bands respectively. For instance, if the wideband transmitting RF signal RFwt is band 41 (B41) of LTE, 2496 MHz to 2590 MHz of the B41 may be defined as a first frequency band, and 2591 MHz to 2690 MHz of the B41 may be defined as a second frequency band. When the wideband transmitting RF signal RFwt in the first frequency band is transmitted to the first input end 42, the control unit 45 will turn on one of amplifying units 27 and turn off other amplifying units 27. Thus, the wideband transmitting RF signal RFwt in the first frequency band may be transmitted to a first transmitting path PATHt1, and a first narrow band filter 231 is able to filter the wideband transmitting RF signal RFwt in the first frequency band. Further, when the wideband transmitting RF signal RFwt in the second frequency band is transmitted to the first input end 42, the control unit 45 will turn on another amplifying unit 27 and turn off other amplifying units 27. Thus, the wideband transmitting RF signal RFwt in the second frequency band may be transmitted to a second transmitting path PATHt2, and a second narrow band filter 233 is able to filter the wideband transmitting RF signal RFwt in the second frequency band. It is unnecessary to install the wideband filter 15 in the wideband front-end device 40 to reduce the production costs and maintain the performance of the wideband front-end device 40.

In actual application, a wideband receiving RF signal RFwr can also be divided into a plurality of frequency bands or narrow band signals based on the frequency band plan of the baseband or the transceiver connecting to the embodiment of the invention. Each receiving path is used to receive the wideband receiving RF signal RFwr or narrow band signals with different frequency bands respectively, and each narrow band filter 23 is able to filter the wideband receiving RF signal RFwr or narrow band signals with different frequency bands respectively. For instance, the wideband receiving RF signal RFwr can be divided into a first frequency band and a second frequency band. The wideband receiving RF signal RFwr in the first frequency band is transmitted to a first receiving path PATHr1, and the first narrow band filter 231 is able to filter the wideband receiving RF signal RFwr in the first frequency band. Further, the wideband receiving RF signal RFwr in the second frequency band may be transmitted to a second receiving path PATHr2, and the second narrow band filter 233 is able to filter the wideband receiving RF signal RFwr in the second frequency band.

In one embodiment of the invention, the receiving end 49 is connected to each first connecting end 43 via each first switch unit 22 respectively. Each first switch units 22 is used to switch the connection between the receiving end 49 and each first connecting end 43 respectively, and the receiving end 49 is able to receive the wideband receiving RF signal RFwr from each first connecting end 43 via each first switch unit 22 respectively. Further, when the wideband front-end device 40 is transmitting the wideband transmitting RF signal RFwt, each first switch unit 22 will be turned off to isolate the receiving end 49 and each first connecting end 43, and the wideband transmitting RF signals RFwt with different frequency bands can be transmitted to an antenna via each transmitting path respectively. When the wideband front-end device 40 is used to receive the wideband receiving RF signal RFwr, the control unit 45 may turn off all amplifying units 27 and turn on part of or all second switch units 22. For instance, the control unit 45 turns on part of first switch units 22 according to the frequency band of the wideband receiving RF signal RFwr. The receiving end 49 is able to be electrically connected to one or more than one first connecting end 43 via the first switch unit 22 to receive the wideband receiving RF signal RFwr from the first connecting end 43 via the receiving path.

In another embodiment of the invention, the amplifying unit 27 connected to the first input end 42 may be similar to a driver stage amplifier, and the amplifying units 27 connected to each first connecting end 43 may be similar to an output stage amplifier.

Figure 9:
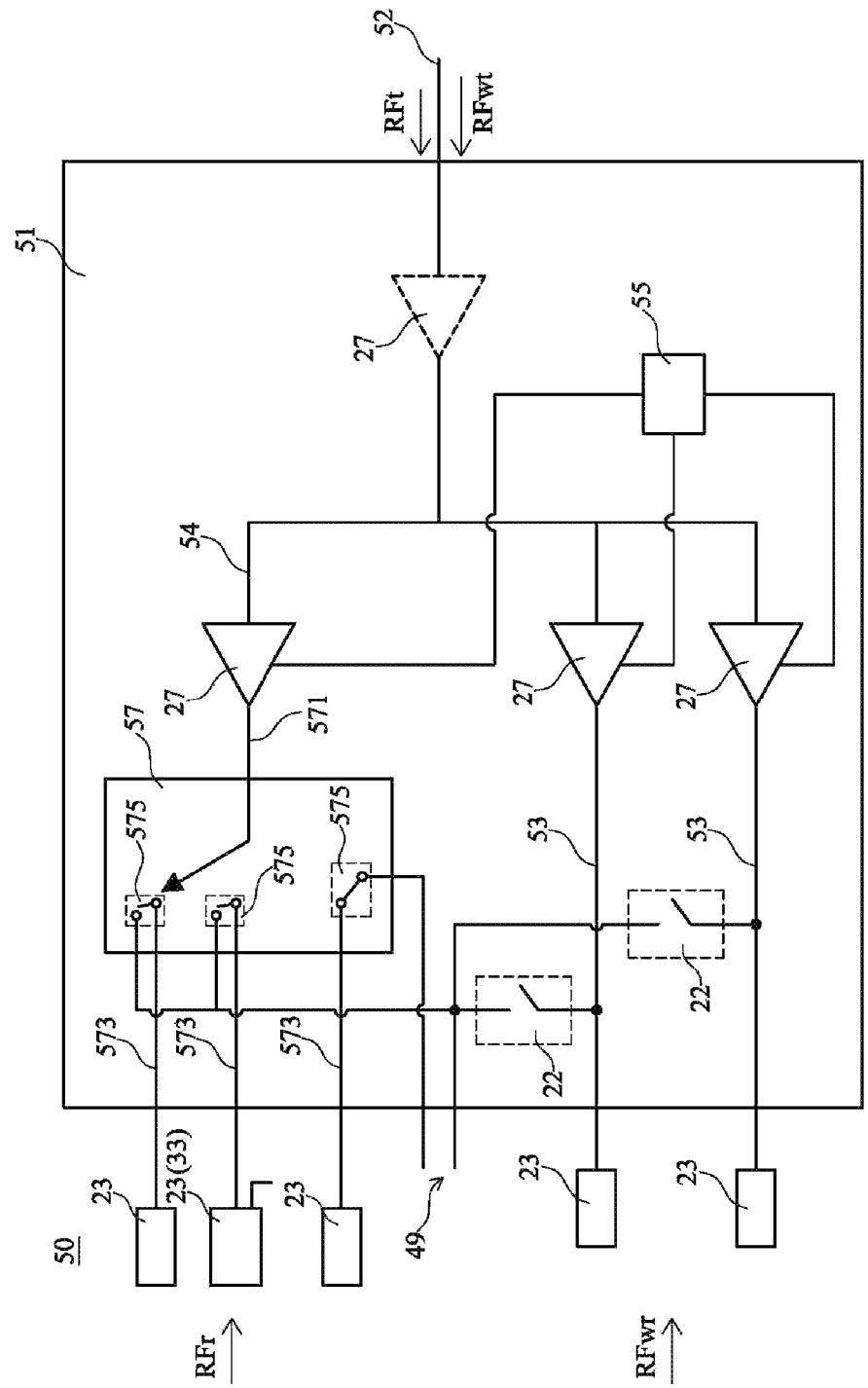
FIG. 9 is a circuit diagram of a wideband front-end device according to another embodiment of the invention.

FIG. 9 is a circuit diagram of a wideband front-end device according to another embodiment of the invention. The wideband front-end device 50 comprises a wideband amplifying module 51 and a plurality of narrow band filters 23, and the wideband amplifying module 51 is electrically connected to each narrow band filter 23.

The wideband amplifying module 51 comprises a plurality of amplifying units 27, a control unit 55, a first input end 52, a plurality of first connecting ends 53, a transmitting end 54, at least one receiving end 49 and at least one switch device 57. The transmitting end 54 is connected to the switch device 57 via the amplifying unit 27, and each first connecting end 53 is electrically connected to each amplifying unit 27 and each narrow band filter 23. Further, the control unit 55 is connected to each amplifying unit 27 to turn on or turn off each amplifying unit 27 respectively. The switch device 57 comprises a second input end 571 and a plurality of second connecting ends 573. The second input end 571 of the switch device 57 is connected to the transmitting end 54 via the amplifying unit 27, and each second connecting end 573 of the switch device 57 is connected to the narrow band filter 23 or the DUP filter 33.

In one embodiment of the invention, the switch device 57 comprises a plurality of second switch units 575. Each second switch unit 575 is electrically connected to the second connecting ends 573 and the receiving end 49, and is able to connect the receiving end 49 to one of each second connecting end 573 and respectively. For instance, when the second switch device 57 of the wideband front-end device 50 is transmitting the transmitting RF signal RFt, each second switch unit 575 will be turned off to isolate the receiving end 49 and each second connecting end 573, and the transmitting RF signal RFt is able to be transmitted to the narrow band filter 23 and/or the DUP filter 33 from the second connecting end 573 of the second switch device 57. When the switch device 57 of the wideband front-end device 50 is used to receive the receiving RF signal RFr, part of or all second switch unit(s) 575 may be turned on. The receiving end 49 is able to be electrically connected to the second connecting end 573 to receive the receiving RF signal RFr from the second connecting end 573 and the switch device 57. In this embodiment of the invention, the second switch units 575 are located within the second switch device 57. In other embodiment of the invention, the second switch units 573 may be located outside of the second switch device 57.

The RF signal received by the wideband front-end device 50 may be classified into the transmitting RF signal RFt and the wideband transmitting RF signal RFwt. The frequency band between the transmitting RF signal RFt and the wideband transmitting RF signal RFwt may be the same or different, and the distinction between the transmitting RF signal RFt and the wideband transmitting RF signal RFwt is the band width of the wideband transmitting RF signal RFwt larger than the transmitting RF signal RFt. When the transmitting RF signal RFt is transmitted to the wideband front-end device 50, the control unit 55 turns on the amplifying unit 27 connected to the switch device 57 and turns off the amplifying unit(s) 27 connected to the first connecting end 53, and the transmitting RF signal RFt may be transmitted to the switch device 57 via the first input end 52, the amplifying unit 27 and the second input end 571. Further, the switch device 57 is able to transmit the transmitting RF signal RFt to one of second connecting ends 573 to filter the transmitting RF signal RFt by the narrow band filter 23 connected to the second connecting end 573.

When the wideband transmitting RF signal RFwt is transmitted to the wideband front-end device 50, the control unit 55 turns off the amplifying unit 27 connected to the switch device 57. Further, the control unit 55 turns on one of amplifying units 27 connected to the first connecting end 53 according to the frequency band of the wideband transmitting RF signal RFwt. Then, the wideband transmitting RF signal RFwt with different frequency bands can be transmitted to different first connecting ends 53 respectively to filter the wideband transmitting RF signal RFwt with different frequency bands by different narrow band filters 23. The wideband frond-end device 50 divides the wideband transmitting RF signal RFwt into a plurality of RF signals with narrow bandwidth or narrow band signals, and the narrow band filter 23 is able to filter the RF signals with narrow bandwidth or narrow band signals to reduce production costs of the wideband front-end device 50. The detail method or structure has been described in FIG. 8, and the repetitious details need not be given here.

The RF signal received by the wideband front-end device 50 may be classified into the receiving RF signal RFr and the wideband receiving RF signal RFwr. The frequency band between the receiving RF signal RFr and the wideband receiving RF signal RFwr may be the same or different, the distinction between the receiving RF signal RFr and the wideband receiving RF signal RFwr is the bandwidth of the wideband receiving RF signal RFwr larger than the receiving RF signal RFr. When the wideband front-end device 50 is used to receive the receiving RF signal RFr, part of or all second switch units 575 may be turned on, and the receiving RF signal RFr may be transmitted to the receiving end 49 via the second connecting end 573 and the second switch unit 575. When the wideband front-end device 50 is used to receive the wideband receiving RF signal RFwr, part of or all first switch units 22 may be turned on. For instance, part of or all first switch units 22 may be turned on according the frequency band of the wideband receiving RF signal RFwr. Thus, the receiving end 49 is able to be electrically connected to one or more than one first connecting end 53 via the first switch unit 22 to receive the wideband receiving RF signal RFwr from the first connecting end 53.

In other embodiment of the invention, the first input end 52, each first connecting end 53 and the second input end 571 are all connected to the amplifying unit 27 respectively. The amplifying unit 27 connected to the first input end 52 may be similar to a driver stage amplifier, and the amplifying units 27 connected to the first connecting end 53 and the second input end 571 may be similar to an output stage amplifier.

In this embodiment of the invention, the wideband front-end device 50 is able to divide the wideband transmitting RF signal RFwt into a plurality of RF signals with narrow bandwidth or narrow band signals in advance by the baseband or the transceiver connecting to the first input end 52, and the narrow band filter 23 is able to filter the RF signals with narrow bandwidth or narrow band signals to reduce production costs of the wideband front-end device 50. Further, the wideband front-end device 50 comprises a control unit 55 to turn on or turn off each amplifying unit 27 respectively, and the wideband front-end device 50 does not request to install the switch device or switch unit behind the amplifying units 27 connected to the first connecting end 53, such as between the amplifying units 27 connected to the first connecting end 53 and the narrow band filter 23 or the antenna to reduce the power loss of the wideband transmitting RF signal RFwt.

Figure 10:
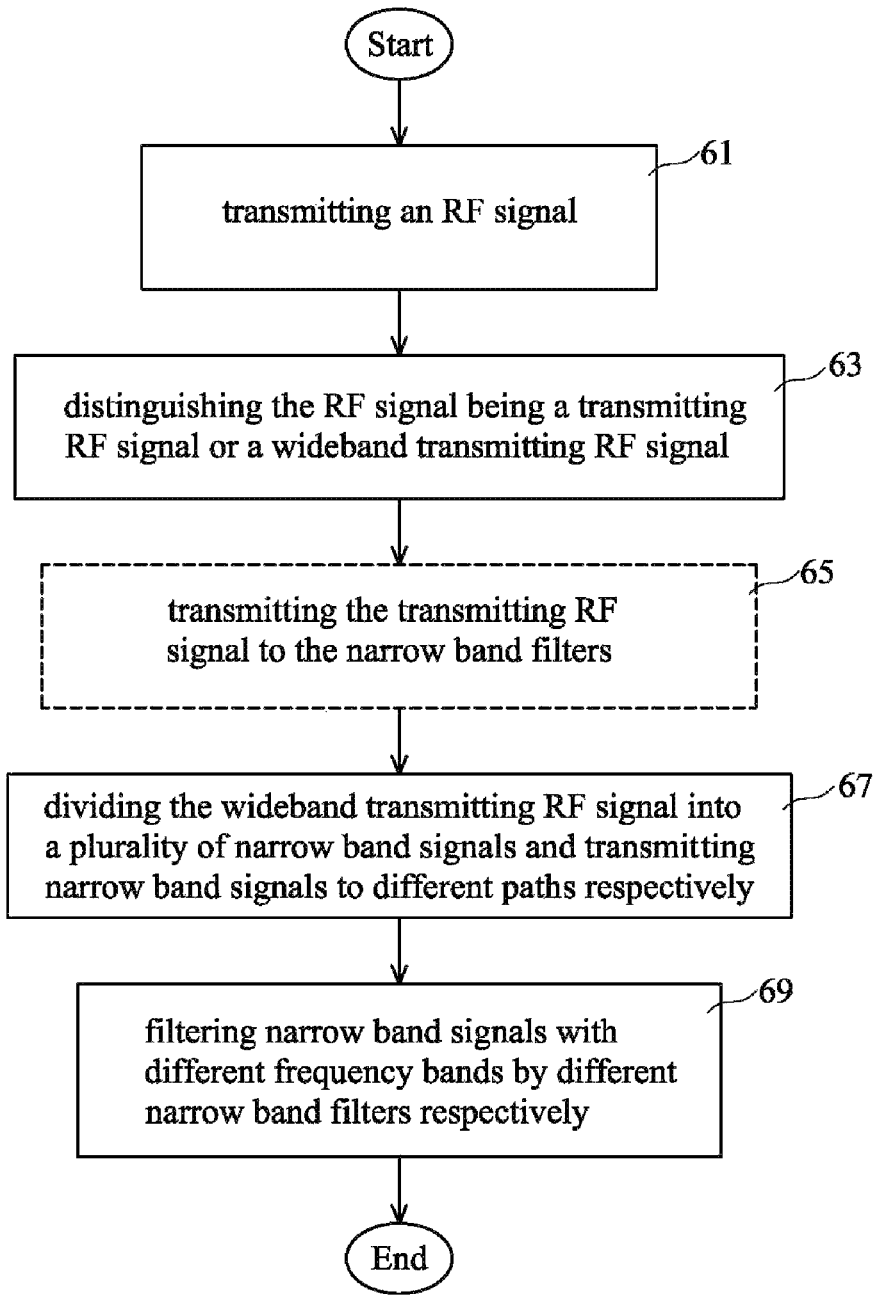
FIG. 10 is a flow chart of an RF signal filtering method of a wideband front-end device according to an embodiment of the invention.

FIG. 10 is a flow chart of an RF signal filtering method of a wideband front-end device according to an embodiment of the invention. The RF signal filtering method of the embodiment may be applied in the wideband front-end devices 20/30/40/50 of above embodiments. The wideband front-end devices 20/30/40/50 are not limitation of the filtering method, and the filtering method of the invention is able to be applied in other wideband front-end devices.

The wideband front-end devices 20/30/40/50 transmit an RF signal, as the step 61. The wideband front-end devices 20/30/40/50 distinguish the RF signal being a transmitting RF signal RFt or a wideband transmitting RF signal RFwt. The frequency band between the transmitting RF signal RFt and the wideband transmitting RF signal RFwt may be the same or different, and the distinction between the transmitting RF signal RFt and the wideband transmitting RF signal RFwt is the bandwidth of the wideband transmitting RF signal RFwt larger than the transmitting RF signal RFt. For instance, the wideband transmitting RF signal RFwt may be but not limited to B41 of LTE, and the transmitting RF signal RFt may be but not limited to B7, B38 and B40 of LTE, as the step 63.

The transmitting RF signal RFt is transmitted to the narrow band filter to filter the transmitting RF signal RFt, as the step 65. In actual application, the wideband front-end devices 20/30/40/50 may not receive or transmit the transmitting RF signal RFt, and the step 65 is not limitation of the invention. The wideband front-end devices 20/30/40/50 divide the wideband transmitting RF signal RFwt into a plurality of frequency bands or narrow band signals, as the step 67 and transmit different band signal to different transmit/receive path. For instance, the wideband transmitting RF signal RFwt may be divided into a first frequency band and a second frequency band. The wideband transmitting RF signals RFwt with different frequency bands are transmitted to different narrow band filters to filter the wideband transmitting RF signals RFwt with different frequency respectively, as the step 69.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A wideband front-end device, comprising a wideband amplifying module for receiving a wideband transmitting RF signal and outputting a plurality of narrow band signals with different frequency bands, said wideband amplifying module including:
    a first switch device including at least one first input end, at least one first transmitting end, and a plurality of first connecting ends, wherein said first input end is electrically connected to said first transmitting end or one of said first connecting ends via said first switch device, and said first input end is connected to one of said first connecting ends according to said frequency band of said wideband transmitting RF signal inputted into said first input end to transmit said wideband transmitting RF signal from said first input end to one of said first connecting ends, and thus each said first connecting end outputs said narrow band signal with different frequency bands respectively;
    a second switch device including:
        a second input end electrically connected to said first transmitting end of said first switch device, wherein a transmitting RF signal is inputted into said first input end of said first switch device, and is transmitted to said second switch device via said first switch device, said first transmitting end, and said second input end, and wherein a bandwidth of said wideband transmitting RF signal is larger than a bandwidth of said transmitting RF signal, and
        a plurality of second connecting ends electrically connected to a narrow band filter respectively, wherein said transmitting RF signal inputted into said second input end is transmitted to one of said second connecting ends via said second switch device, and is filtered by said narrow band filter connected to said second connecting end;
    at least one receiving end connected to each said first connecting end via a respective first switch unit to receive a wideband receiving RF signal from said first connecting end; and
    at least one amplifying unit electrically connected to said first switch device to amplify said wideband transmitting RF signal.

2. The wideband front-end device according to claim 1, further comprising a plurality of narrow band filters electrically connected to said first connecting ends of said first switch device respectively or said receiving end for filtering said narrow band signals with different frequency bands or said wideband receiving RF signal with different frequency bands respectively.

3. The wideband front-end device according to claim 1, wherein:
    said amplifying unit is electrically connected to said first input end of said first switch device, or
    each of said amplifying units is electrically connected to a corresponding one of said first connecting ends of said first switch device.

4. The wideband front-end device according to claim 3, wherein:
    each of said amplifying units is electrically connected to a corresponding one of said first connecting ends of said first switch device, and
    said wideband transmitting RF signal is transmitted through transmitting paths behind said amplifying units without any series switch unit.

5. A wideband front-end device comprising a wideband amplifying module for receiving a wideband transmitting RF signal and outputting a plurality of narrow band signals with different frequency bands, said wideband amplifying module including:
    a first switch device including at least one first input end, at least one first transmitting end, and a plurality of first connecting ends, wherein said first input end is electrically connected to said first transmitting end or one of said first connecting ends via said first switch device, and said first input end is connected to one of said first connecting ends according to said frequency band of said wideband transmitting RF signal inputted into said first input end to transmit said wideband transmitting RF signal from said first input end to one of said first connecting ends, and thus each said first connecting end outputs said narrow band signal with different frequency bands respectively;
    at least one amplifying unit electrically connected to said first switch device to amplify said wideband transmitting RF signal; and
    a second switch device, said second switch device including:
        a second input end electrically connected to said first transmitting end of said first switch device, wherein a transmitting RF signal is inputted into said first input end of said first switch device, and is transmitted to said second switch device via said first switch device, said first transmitting end, and said second input end, and wherein a bandwidth of said wideband transmitting RF signal is larger than a bandwidth of said transmitting RF signal, and
        a plurality of second connecting ends electrically connected to a narrow band filter respectively, wherein said transmitting RF signal inputted into said second input end is transmitted to one of said second connecting ends via said second switch device, and is filtered by said narrow band filter connected to said second connecting end.

6. The wideband front-end device according to claim 1, further comprising a plurality of second switch units each electrically connected to a corresponding one of said second connecting ends of said second switch device, and further electrically connected to said receiving end.

7. The wideband front-end device according to claim 5, wherein:
said amplifying unit is electrically connected to said first input end of said first switch device, or
each of said amplifying units is electrically connected to a corresponding one of said first connecting ends or to said first transmitting end of said first switch device.

8. The wideband front-end device according to claim 7, wherein:
each of said amplifying units is electrically connected to a corresponding one of said first connecting ends of said first switch device, and
said wideband transmitting RF signal or said transmitting RF signal is transmitted through transmitting paths behind said amplifying units without any series switch unit.

9. A wideband front-end device comprising a wideband amplifying module for receiving a wideband transmitting RF signal and outputting a plurality of narrow band signals with different frequency bands, said wideband amplifying module including:
at least one first input end receiving said wideband transmitting RF signal;
a plurality of first connecting ends electrically connected to said first input end;
a plurality of first amplifying units connected to each said first connecting end respectively;
at least one receiving end electrically connected to each said first connecting end via a corresponding first switch unit to receive a wideband receiving RF signal from said first connecting end;
a control unit electrically connected to each first amplifying unit to turn on or turn off each first amplifying unit, wherein said control unit turns on one of said first amplifying units according to frequency band of said wideband transmitting RF signal, and each first amplifying unit is able to amplify said narrow band signals with different frequency bands respectively;
at least one transmitting end electrically connected to said first input end, said first amplifying unit electrically connected to said transmitting end; and
a switch device including:
a second input end electrically connected to said transmitting end via said first amplifying unit, wherein a transmitting RF signal inputted into said first input end is transmitted to said switch device via said transmitting end, said first amplifying unit, and said second input end, and
a plurality of second connecting ends electrically connected to a narrow band filter respectively, wherein said transmitting RF signal inputted into said second input end is transmitted to one of said second connecting ends via said switch device, and is filtered by said narrow band filter connected to said second connecting end.

10. The wideband front-end device according to claim 9, further comprising a plurality of narrow band filters electrically connected to said first connecting ends or said receiving end of said wideband amplifying module respectively for filtering said narrow band signals with different frequency bands or said wideband receiving RF signal with different frequency bands.

11. The wideband front-end device according to claim 9, further comprising a second amplifying unit electrically connected to said first input end of said wideband amplifying module.

12. The wideband front-end device according to claim 9, further comprising a plurality of second switch units each electrically connected to a corresponding one of said second connecting ends, and further electrically connected to said receiving end of said switch device.

* * * * *